(12) United States Patent
Chiu

(10) Patent No.: US 11,397,661 B1
(45) Date of Patent: Jul. 26, 2022

(54) SYSTEM AND METHOD FOR MONITORING OFFLINE STATE OF ELECTRONIC DEVICE

(71) Applicant: GETAC TECHNOLOGY CORPORATION, Hsinchu County (TW)

(72) Inventor: Chia-Chang Chiu, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 17/405,237

(22) Filed: Aug. 18, 2021

(51) Int. Cl.
| | |
|---|---|
| *G06F 11/34* | (2006.01) |
| *G06F 13/20* | (2006.01) |
| *G06F 13/24* | (2006.01) |
| *G06F 11/30* | (2006.01) |
| *G06F 1/16* | (2006.01) |

(52) U.S. Cl.
CPC .......... *G06F 11/349* (2013.01); *G06F 1/1632* (2013.01); *G06F 11/3027* (2013.01); *G06F 11/3055* (2013.01); *G06F 13/20* (2013.01); *G06F 13/24* (2013.01)

(58) Field of Classification Search
CPC ............... G06F 11/349; G06F 11/1632; G06F 11/3027; G06F 11/3055; G06F 13/20; G06F 13/24
See application file for complete search history.

(56) References Cited

U.S. PATENT DOCUMENTS

| | | | | |
|---|---|---|---|---|
| 7,630,647 | B2 * | 12/2009 | Tseng ................. | H04B 10/1143 398/118 |
| 2003/0093607 | A1 * | 5/2003 | Main ................... | G06F 13/4045 710/306 |
| 2015/0347348 | A1 * | 12/2015 | Gouw ................. | G06F 13/4221 710/313 |
| 2017/0242804 | A1 * | 8/2017 | Voor ....................... | G06F 3/023 |

\* cited by examiner

*Primary Examiner* — Henry Tsai
*Assistant Examiner* — Christopher A Daley

(57) ABSTRACT

A system and method for monitoring an offline state of an electronic device includes a dock and the electronic device. The dock includes a connection pin. The electronic device includes a connection port and an embedded controller, wherein a GPIO pin of the embedded controller is coupled to the connection port, the connection port is coupled to the connection pin, and the GPIO pin detects whether the connection port is in a first or second potential state. The connection port is in the first potential state in an online state, and is in the second potential state in an offline state. The embedded controller counts the number of signal transmissions by a second frequency, until the embedded controller detects that the connection port is in the online state. The embedded controller calculates an interrupt period according to the number of signal transmissions and the second frequency.

10 Claims, 7 Drawing Sheets

SYSTEM AND METHOD FOR MONITORING OFFLINE STATE OF ELECTRONIC DEVICE

BACKGROUND OF THE INVENTION

Field of the Invention

The present invention relates to a monitoring technique for an electronic device, and more particularly, to a system and a method for monitoring an offline state of an electronic device.

Description of the Prior Art

In order to achieve the goal of lightweight computers, many computer devices adopt the means of a dock for expansion. When a computer is mounted on a corresponding dock, the computer can expand interfaces for other communication protocols. Hence, expansion docks have been launched by manufacturers in the aim of allowing computers to be secured to the expansion docks. The computer and the expansion dock are respectively provided with corresponding pins (or contacts). When the computer is secured at the expansion dock, the computer can communicate with the expansion dock through the respective pins (or contacts).

The foregoing pins (or contacts) are provided in joining side surfaces of the computer and the expansion dock. Thus, when the computer is secured at the expansion dock, the pins (or contacts) cannot be observed. Judging from the appearance, whether the pin of the computer is connected to the contact of the expansion dock cannot be determined. For example, due to an impact received by the computer or weather condition factors, the pin and the contact may not properly come into contact with each other.

SUMMARY OF THE INVENTION

In view of the above, in some embodiments, a system for monitoring an offline state of an electronic device includes a dock and an electronic device. The dock includes a connection pin. The electronic device includes a connection port and an embedded controller. The connection port is coupled to the connection pin, a general-purpose input/output (GPIO) pin of the embedded controller is coupled to the connection port, and the GPIO pin detects a potential state of the connection port, wherein the potential state is a first potential state or a second potential state. In an online state, the connection port is coupled to the connection pin, and the potential state is the first potential state; in an offline state, the connection port is disconnected from the connection pin, and the potential state is the second potential state. The embedded controller detects by a first frequency whether the connection port is in the offline state. When the connection port is in the offline state, the embedded controller detects by a second frequency whether the connection port is in the online state and counts the number of signal transmissions, until the embedded controller detects that the connection port is in the online state. The embedded controller calculates an interrupt period according to the number of signal transmissions and the second frequency. When the electronic device is interrupted from the dock, the electronic device may be switched to a high-precision state for recording a total interrupt period of the dock.

In some embodiments, the embedded controller includes a buffer memory, and the embedded controller packetizes information of the interrupt period and the number of signal transmissions as offline information, and writes the offline information to the buffer memory.

In some embodiments, the electronic device includes a first processor electrically connected to the connection port and the embedded controller. The first processor executes a monitoring program to call an input/output interface or an operating system management interface to access the offline information in the buffer memory.

In some embodiments, the monitoring program reads the offline information from the buffer memory in a first-in-first-out (FIFO) manner.

In some embodiments, the electronic device includes a network unit. The monitoring program sends the offline information to a remote server through the network unit, and the remote server sends prompt information to the electronic device according to the offline information.

In some embodiments, a method for monitoring an offline state of an electronic device includes: docking an electronic device in a dock so that a connection port of the electronic device is coupled to a connection pin of the dock; an embedded controller of the electronic device detecting by a first frequency whether the connection port is interrupted from the connection pin; if the connection port is interrupted, the embedded controller counting by a second frequency the number of signal transmissions until the connection port is coupled to the connection pin; and the embedded controller calculating an interrupt period according to the number of signal transmissions and the second frequency.

In some embodiments, wherein the step of docking the electronic device in the dock so that the connection port of the electronic device is coupled to the connection pin of the dock includes: in an online state, the connection port is coupled to the connection pin, and a potential state of the connection port is a first potential state; and in an offline state, the connection port is disconnected from the connection pin and the potential state is a second potential state.

In some embodiments, the step of the embedded controller calculating the interrupt period according to the number of signal transmissions and the second frequency includes: the embedded controller packetizing information of the first frequency and the number of signal transmissions as offline information; and the embedded controller writing the offline information to a buffer memory.

In some embodiments, the step of the embedded controller writing the offline information to the buffer memory includes: the embedded controller sending the offline information to a remote server.

In some embodiments, the remote server sends prompt information to the electronic device according to the offline information.

In conclusion, the system and the method for monitoring an offline state of an electronic device according to any one of the embodiments are capable of more accurately recording the offline state and the interrupt period of the dock without increasing hardware costs, for example, without connecting to other external apparatuses or changing existing circuitry. In some embodiments, the electronic device is further capable of sending the offline information to a remote server. In some embodiments, the electronic device is also capable of receiving prompt information returned from the remote server, and accordingly determining the connection state of the dock.

DETAILED DESCRIPTION OF THE EMBODIMENTS

Figure 1:
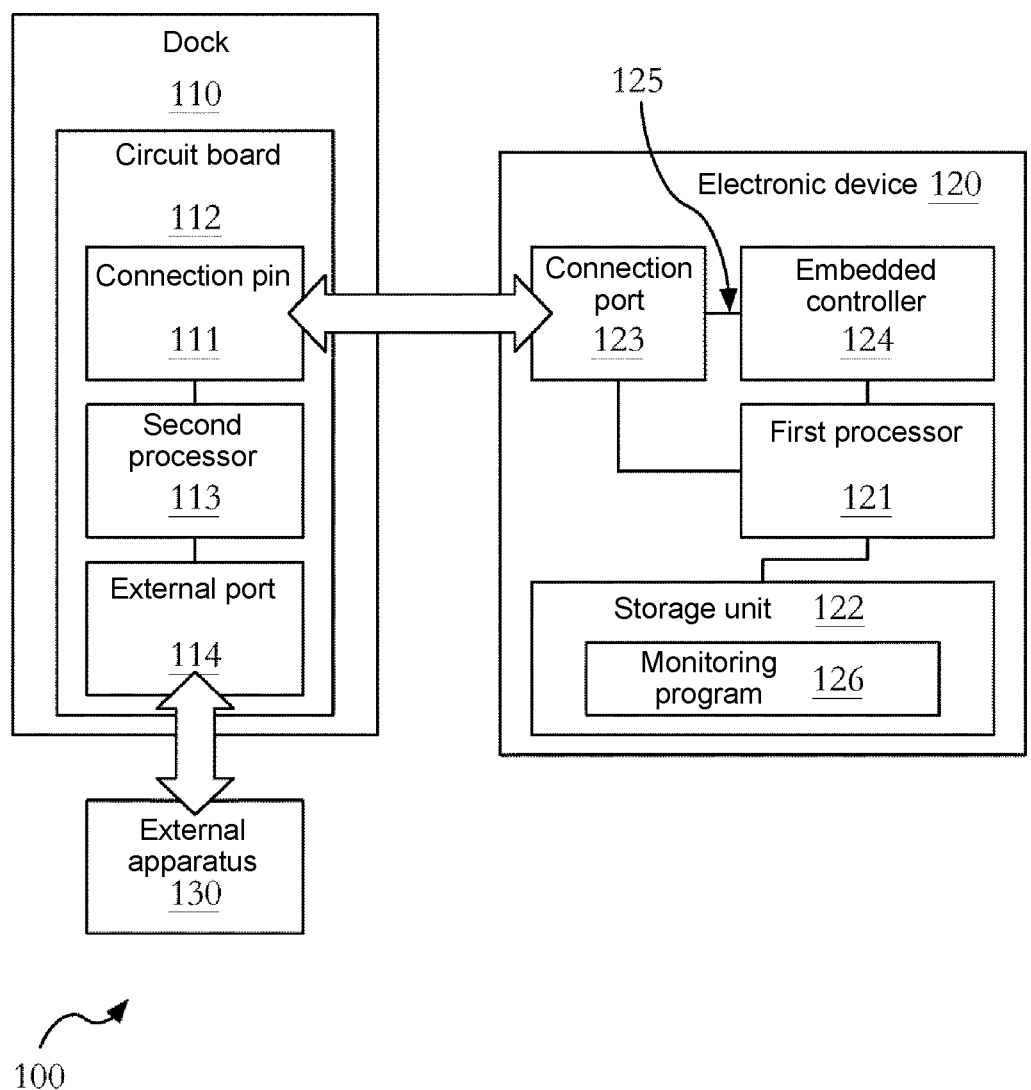
FIG. 1 is a schematic diagram of a hardware structure according to an embodiment.

Referring to FIG. 1, a system 100 for monitoring an offline state of an electronic device 120 includes a dock 110 and the electronic device 120. The electronic device 120 may be, for example but not limited to, a laptop computer, a tablet computer or a mobile phone. The dock 110 includes a connection pin 111, a circuit board 112, a second processor 113 and multiple external ports 114. The electronic device 120 may be optionally docked in the dock 110. The so-called "dock in" means that the electronic device 120 is assembled at a corresponding point of the dock 110, and may be implemented by means such as fitting, mortising or locking. In normal conditions, when the electronic device 120 is docked in the dock 110, the electronic device 120 and the dock 110 are in electrical communication with each other through the docking point.

The circuit board 112 is provided with the connection pin 111, the second processor 113 and the external ports 114. The connection pin 111 is for transmitting a communication signal. Each external port 114 is for connecting to an external apparatus 130. The types of the external ports 114 may be, for example but not limited to, Universal Serial Bus (USB) 2.0, 3.0 or 3.1 ports, Thunderbolt ports, High-Definition Multimedia Interface (HDMI) ports, DisplayPort (DP) ports, Ethernet ports, serial ports or parallel ports. The external apparatus 130 is an electronic apparatus corresponding to the communication protocol of the external port 114. The second processor 113 converts the communication protocol of the connection pin 111 to a communication protocol corresponding to that of the external port 114, so as to bridge the electronic device 120 and the external apparatus 130. The second processor 113 may be, for example but not limited to, a central processing unit (CPU) or a microcontroller unit (MCU).

The electronic device 120 includes a first processor 121, a storage unit 122, a connection port 123 and an embedded controller 124. The first processor 121 is coupled to the storage unit 122, the connection port 123 and the embedded controller 124. The first processor 121 may be, for example but not limited to, a CPU or an MCU. The embedded controller 124 is coupled to the connection port 123. The position of the connection portion 123 corresponds to the position of the connection pin 111 of the dock 1110, and the contact of the connection port 123 also corresponds to the connection pin 111. When the electronic device 120 is docked in the dock 1110, the connection port 123 is coupled to the connection pin 111 of the dock 110. The electronic device 120 controls the external apparatus 130 through the connection port 123 and the connection pin 111. The storage unit 122 stores a monitoring program 126. The storage unit 122 may be, for example but not limited to, a read-only memory (ROM), an electrically-erasable programmable read-only memory (EEPROM), a hard disk drive (HDD) or a solid-state drive (SSD).

The first processor 121 executes the monitoring program 126. The monitoring program 126 is for detecting a connection state and related prompt information of the electronic device 120 and the dock 110. During the process of docking the electronic device 120 in the dock 110, it is possible that the connection pin 111 is not physically in contact with the connection port 123. In one embodiment, a condition in which the electronic device 120 is docked in the dock 110 but not actually coupled thereto is referred to as an offline state (disconn_stat); a situation in which the electronic device 120 is docked in the dock 110 and the connection port 123 is coupled to the connection pin 111 is referred to as an online state (conn_stat).

The embedded controller 124 includes a general-purpose input/output (GPIO) pin 125. The GPIO pin 125 is coupled to a power pin of the connection port 123. In the online state (that is, the electronic device 120 is properly docked in the dock 110), the GPIO pin 125 is electrically connected to the connection pin 111 through the connection port 123. The embedded controller 124 detects potential states of the connection pin 111 and the connection port 123 through the GPIO pin 125. The potential state includes a first potential state and a second potential state. When the connection port 123 and the connection pin 111 are in the online state, the GPIO pin 125 detects that the connection port 123 is in the first potential state. In this embodiment, the first potential state is, for example, a high potential state. When the connection port 123 and the connection pin 111 are in the offline state (that is, when the electronic device 120 is not properly docked in the dock 110, due to reasons such as a sudden interrupt caused by vibration), the GPIO pin 125 detects that the connection port 123 is in the second potential state. In this embodiment, the second potential state is, for example, a low potential state. In the online state, the GPIO pin 125 sends an interrupt request to the connection port 123 by a first frequency freq_1 to thereby detect the potential state of the connection pin 111, so as to detect whether the connection port 123 and the connection pin 111 are in the offline state. In other embodiments, the first potential state may be a low potential state, and the second potential state may be a high potential state.

Figure 2:
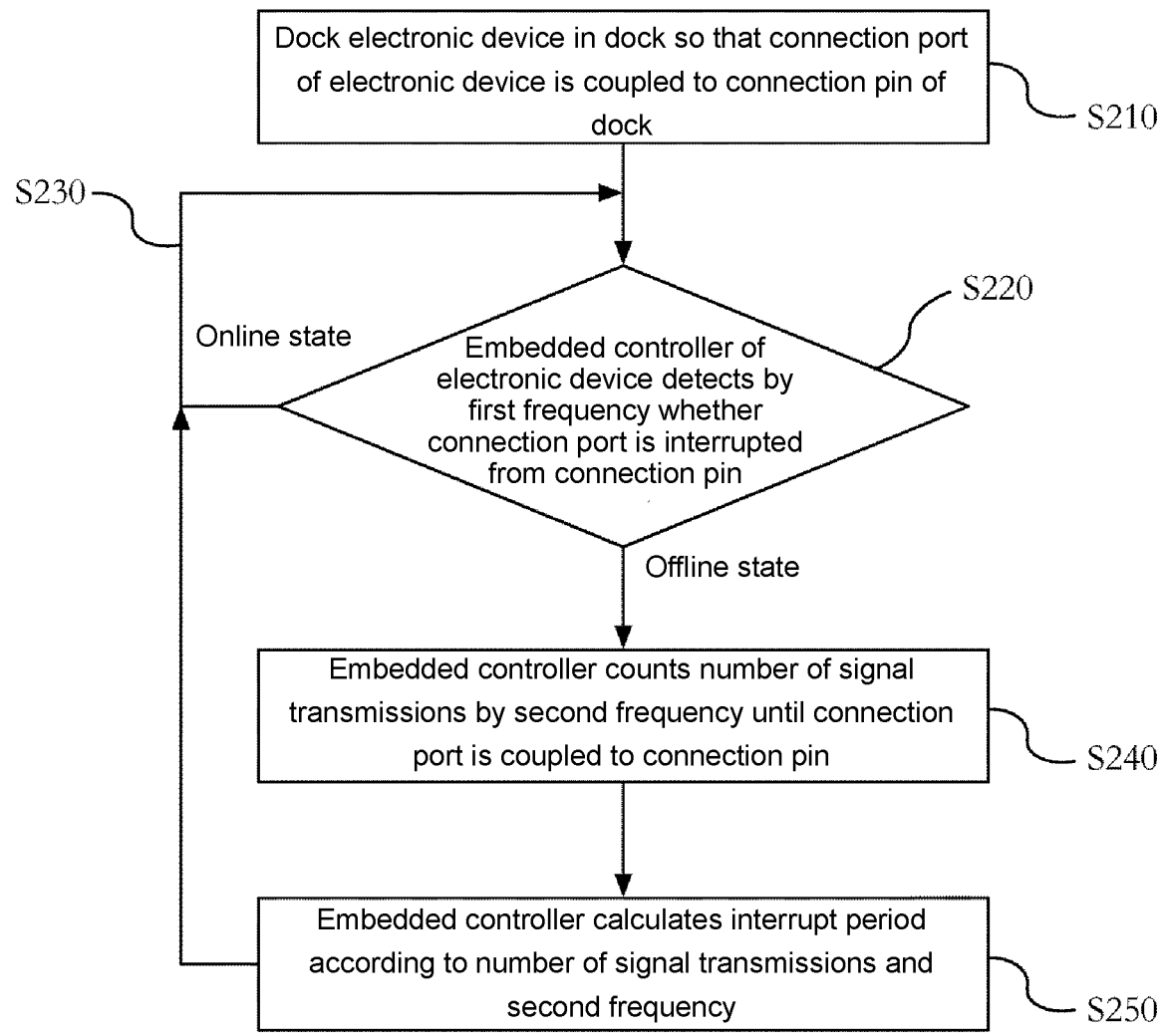
FIG. 2 is a flowchart of an operation process according to an embodiment.
Figure 3:
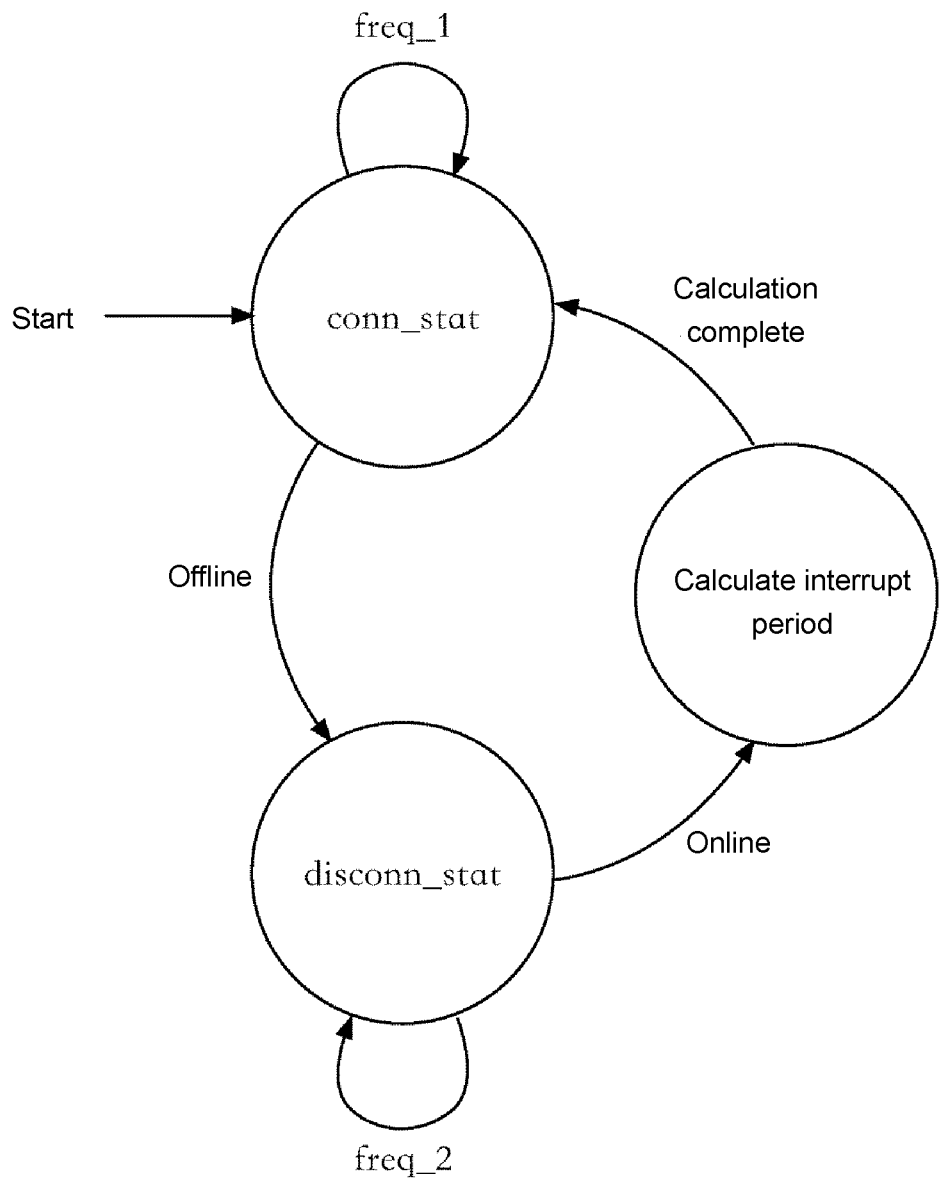
FIG. 3 is a schematic diagram of a finite state machine.

A processing method for monitoring an offline state of the electronic device 120 is further described below. FIG. 2 and FIG. 3 show a flowchart of an operation process and a schematic diagram of a finite state machine according to an embodiment. The processing method for monitoring an offline state of the electronic device 120 includes: step S210 of docking the electronic device 120 in the dock 110 so that the connection port 123 of the electronic device 120 is coupled to the connection pin 111 of the dock 110; step S220 of the embedded controller 124 of the electronic device 120 detecting by the first frequency freq_1 whether the connection port 123 is interrupted from the connection pin 111; step S230 of performing step S230 if it is detected that the connection port 123 is in an online state (conn_stat); step S240 of the embedded controller 124 counting by the second frequency freq_2 the number of signal transmissions until the connection port 123 is coupled to the connection pin 111, if it is detected that the connection port 123 is in an offline state (disconn_stat); and step S250 of the embedded controller 124 calculating the interrupt period T according to the number of signal transmissions and the second frequency freq_2.

More specifically, when the electronic device 120 is docked in the dock 110, the electronic device 120 executes the monitoring program 126. The monitoring program 126 drives the embedded controller 124 to send an interrupt request to the dock 110 to thereby determine a current potential state of the connection port 123. If the online state (conn_stat) is detected, the embedded controller 124 continuously sends an interrupt request at an interval of the first frequency freq_1 to the connection port 123 to thereby detect the potential state of the connection pin 111.

If the embedded controller 124 detects that the connection port 123 is in the offline state (disconn_stat), the embedded controller 124 continuously sends an interrupt request by the second frequency freq_2 to the connection port 123. The second frequency freq_2 is less than or equal to the first frequency freq_1. In general, the interval of the first frequency freq_1 may be in a unit of seconds or minutes, and the interval of the second frequency freq_2 may be set in a unit of microseconds or milliseconds. In the offline state (disconn_stat), the embedded controller 124 counts the number of signal transmissions once each time the interrupt request is sent, until the embedded controller 124 detects that the connection port 123 is in the online state (conn_stat).

When the embedded controller 124 detects the occurrence of the offline state (disconn_stat), the embedded controller 124 clears the contents of a register with respect to the number of signal transmissions. When the connection port 123 changes from the offline state (disconn_stat) to the online state (conn_stat), the embedded controller 124 calculates the interrupt period of the connection port 123 according to the number of signal transmissions and the second frequency freq_2. The embedded controller 124 sends the interrupt period to the monitoring program 126.

Figure 4:
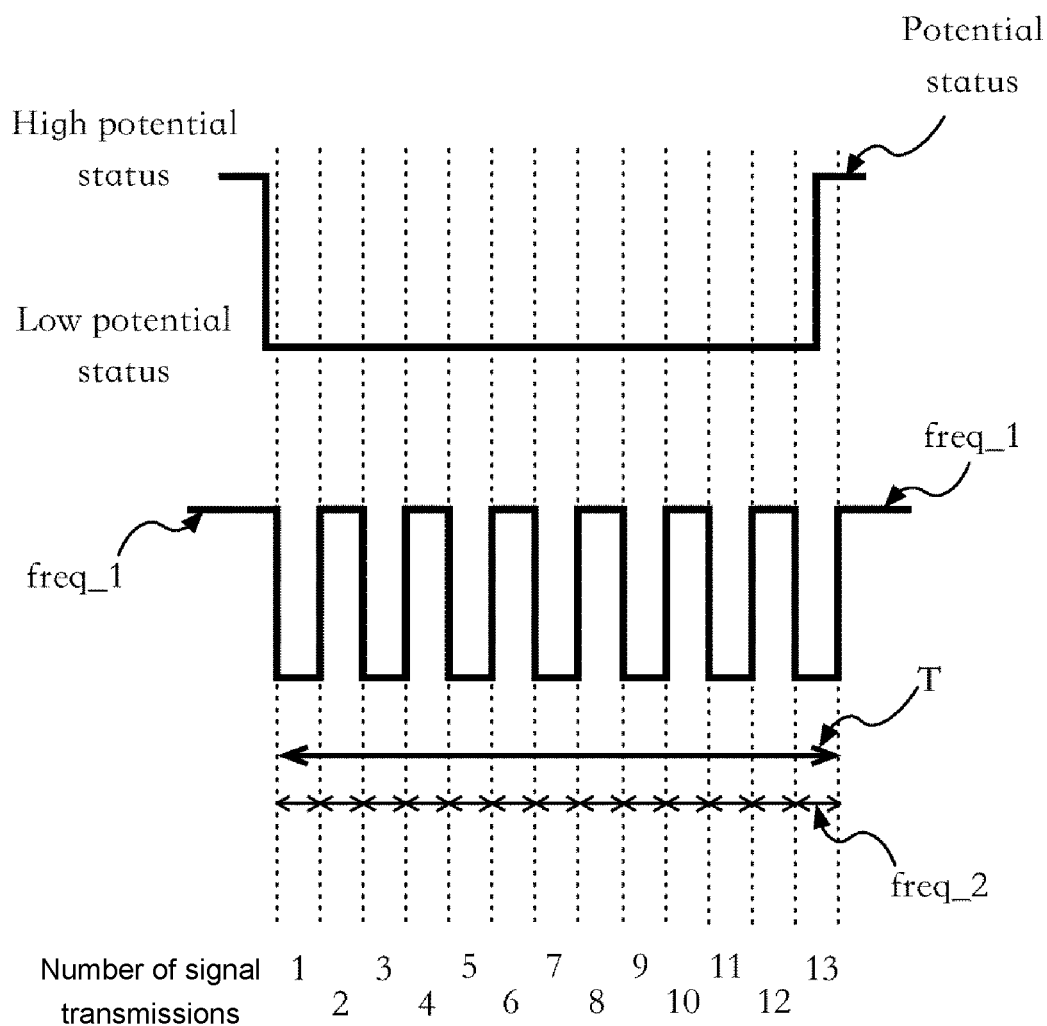
FIG. 4 is a schematic diagram of a second frequency and a potential state according to an embodiment.

Refer to FIG. 4 showing a schematic diagram of the second frequency freq_2 and the potential state according to an embodiment. The upper part of FIG. 4 depicts the potential state of the connection port 123; the potential state of the connection port 123 changes from the online state (conn_stat) to the offline state (disconn_stat), and then returns from the offline state (disconn_stat) to the online state (conn_stat). The lower part of FIG. 4 depicts that the embedded controller 124 sends the interrupt request by the second frequency freq_2. For better understanding, one half of a pulse is used as the cycle of the second frequency freq_2 in the lower part of FIG. 4.

Assume that the corresponding cycle of the second frequency freq_2 is and the total number of signal transmissions is 13 times. The embedded controller 124 may calculate the interrupt period T of the interrupt of the connection port 123 according to the second frequency freq_2 and the number of signal transmissions. The interrupt period T is 70 μs*13, and the result is 910 (equal to 0.91 ms). The lower part of FIG. 4 depicts the contents of the number of signal transmissions counted.

Figure 5:
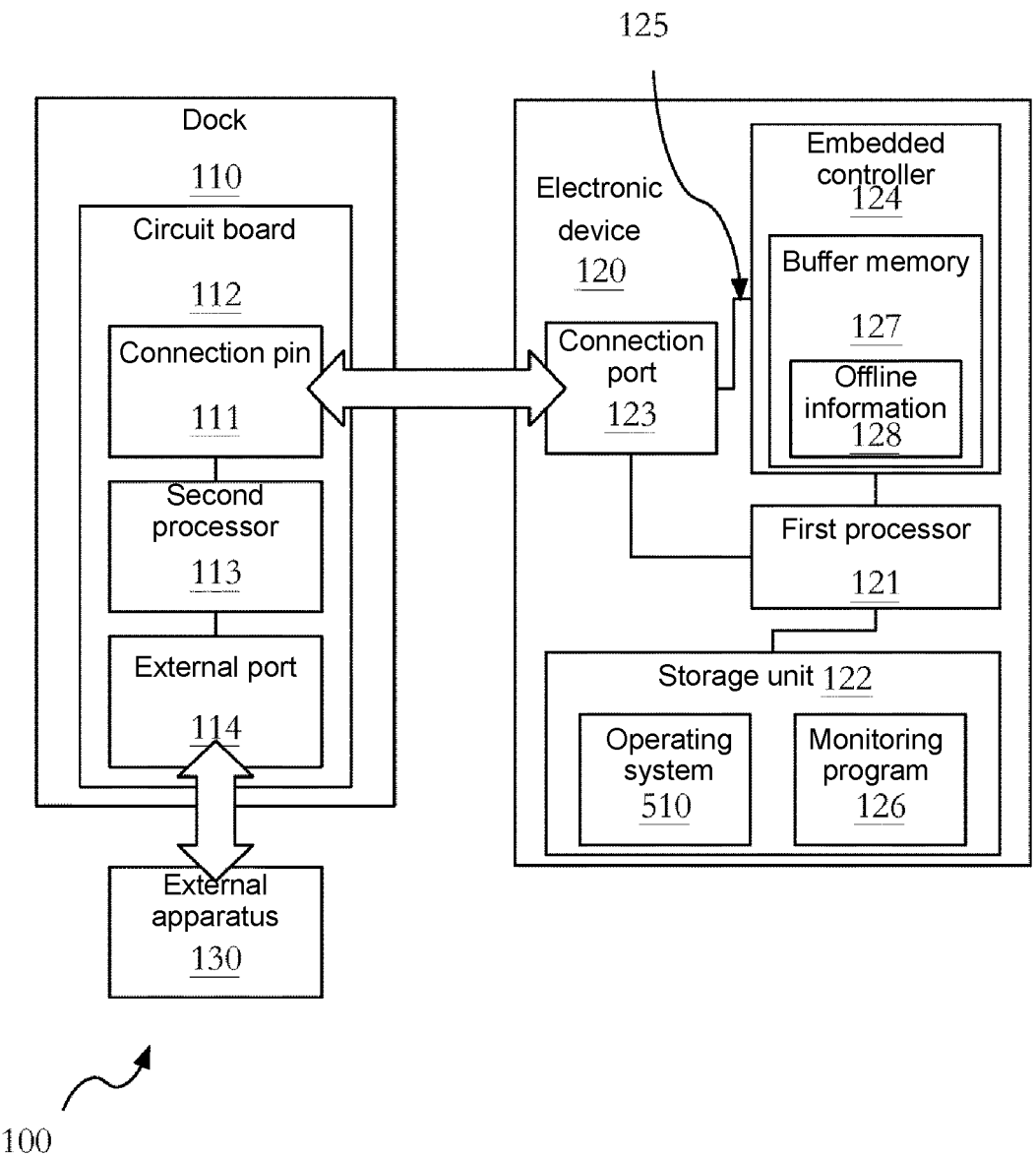
FIG. 5 is a schematic diagram of a hardware structure according to an embodiment.

In some embodiments, the embedded controller 124 further includes a buffer memory 127. Referring to FIG. 5, the arrows in FIG. 5 indicate the direction and target of the signal transmission. The buffer memory 127 is for recording information such as the number of signal transmissions, the interrupt period, the timestamp of an occurrence or the number of interrupts. After the embedded controller 124 calculates the interrupt period of a particular time, the embedded controller 124 packetizes information of the number of signal transmissions and interrupt period as offline information, and writes the offline information to the buffer memory 127. The monitoring program 126 determines according to the type of the operating system 510 whether to call an input/output interface or the Windows management interface (WMI) so as to access the offline information in the buffer memory 127.

In some embodiments, the monitoring program 126 reads the offline information 128 from the buffer memory 127 in a first-in-first-out (FIFO) manner. The monitoring program 126 can determine whether to preserve the current offline information 128 or to clear the current offline information 128 according to the remaining capacity of the buffer memory 127.

Figure 6A:
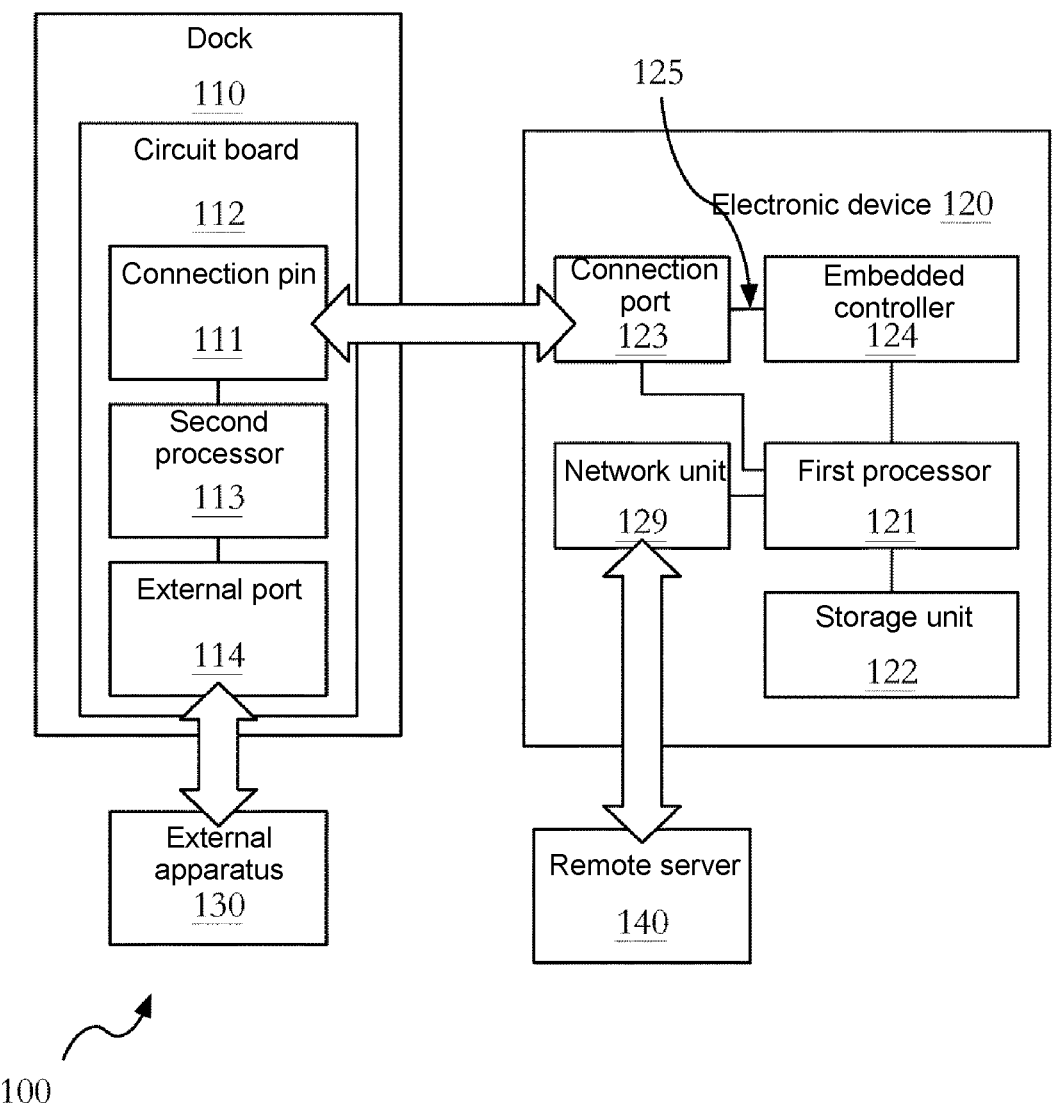
FIG. 6A is a schematic diagram of a hardware structure according to an embodiment.
Figure 6B:
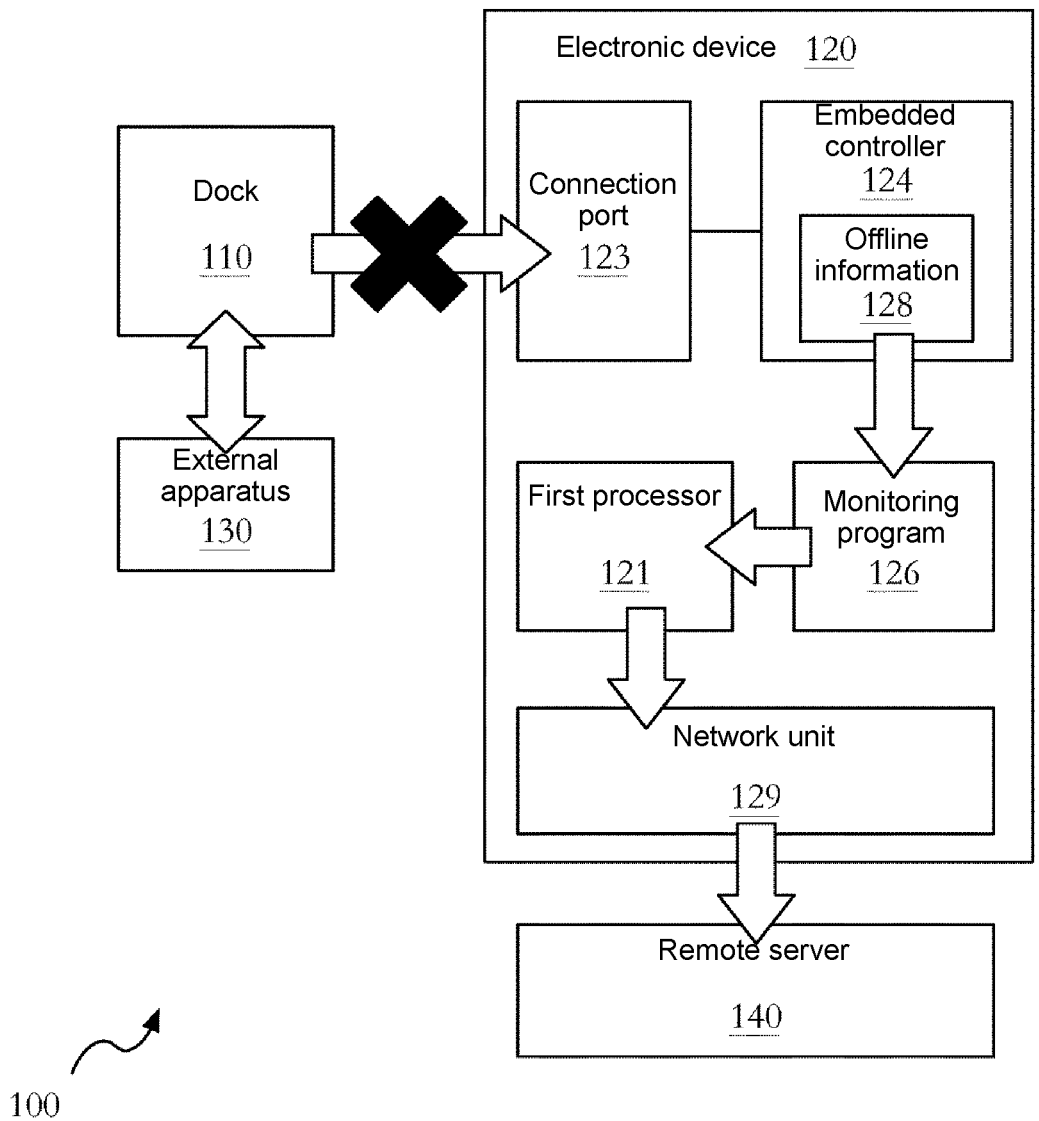
FIG. 6B is a schematic diagram of signal transmission according to an embodiment.

In some embodiments, the electronic device 120 further includes a network unit 129. Referring to FIG. 6A and FIG. 6B, the arrows in FIG. 6A and FIG. 6B indicate the directions and targets of the signal transmission. FIG. 6A shows a schematic diagram of a system structure of a system for monitoring an offline state of an electronic device according to this embodiment, and FIG. 6B shows a schematic diagram of transmission of offline information. The first processor 121 is coupled to the storage unit 122, the connection port 123, the embedded controller 124 and the network unit 129. The network unit 129 may be connected to the remote server 140 by, for example but not limited to, the Fifth-Generation (5G) Mobile Networks, the Fourth-Generation (4G) Mobile Networks, or a wireless Ethernet. After the monitoring program 126 obtains the offline information 128 from the buffer memory 127, the first processor 121 transmits the offline information 128 to the remote server 140 through the network unit 129.

When the remote server 140 receives the offline information 128, the remote server 140 may send prompt information to the electronic device 120. Once the electronic device 120 receives the prompt information, the monitoring program 126 and the operating system 510 check a device list in the system according to the prompt information to thereby determine whether the dock 110 is offline.

In conclusion, the system 100 and the method for monitoring an offline state of the electronic device 120 according to any one of the embodiments are capable of more accurately recording the offline state (disconn_stat) and the interrupt period T of the dock 110 without increasing hardware costs, for example, without connecting to other external apparatuses or changing existing circuitry. In some embodiments, the electronic device 120 is further capable of sending the offline information 128 to the remote server 140. In some embodiments, the electronic device 120 is also capable of receiving prompt information returned from the remote server 140, and accordingly determining the connection state of the dock 110.

What is claimed is:

1. A system for monitoring an offline state of an electronic device, comprising:
   a dock, comprising a connection pin; and
   the electronic device, comprising a connection port and an embedded controller, the connection port being coupled to the connection pin, a general-purpose input/output (GPIO) pin of the embedded controller being coupled to the connection port, the GPIO pin for detecting a potential state of the connection port, the potential state being a first potential state or a second potential state;
   wherein, in an online state, the connection port is coupled to the connection pin, and the potential state is the first potential state; in an offline state, the connection port is disconnected from the connection pin, and the potential state is the second potential state;
   the embedded controller detects by a first frequency whether the connection port is in the offline state; when the connection port is in the offline state, the embedded controller detects by a second frequency whether the connection port is in the online state and counts the number of signal transmissions until the embedded controller detects that the connection port is in the online state, and the embedded controller calculates an interrupt period according to the number of signal transmissions and the second frequency.

2. The system for monitoring an offline state of an electronic device according to claim 1, wherein the embedded controller comprises a buffer memory, and the embedded controller packetizes information of the interrupt period and the number of signal transmissions as offline information and writes the same to the buffer memory.

3. The system for monitoring an offline state of an electronic device according to claim 2, wherein the electronic device comprises a first processor electrically connected to the connection port and the embedded controller, and the first processor is for executing a monitoring program to call an input/output interface or an operating system management interface to access the offline information in the buffer memory.

4. The system for monitoring an offline state of an electronic device according to claim 3, wherein the monitoring program reads the offline information from the buffer memory in a first-in-first-out (FIFO) manner.

5. The system for monitoring an offline state of an electronic device according to claim 3, wherein the electronic device comprises a network unit, the monitoring program sends the offline information to a remote server through the network unit, and the remote server sends prompt information to the electronic device according to the offline information.

6. A method for monitoring an offline state of an electronic device, comprising:
    docking an electronic device in a dock so that a connection port of the electronic device is coupled to a connection pin of the dock;
    an embedded controller of the electronic device detecting by a first frequency whether the connection port is interrupted from the connection pin;
    if the connection port is interrupted, the embedded controller counting the number of signal transmissions by a second frequency until the connection port is coupled to the connection pin; and
    the embedded controller calculating an interrupt period according to the number of signal transmissions and the second frequency.

7. The method for monitoring an offline state of an electronic device according to claim 6, wherein the step of docking the electronic device in the dock so that the connection pin of the electronic device is coupled to the connection pin of the dock comprises:
    in an online state, the connection port is coupled to the connection pin, and a potential state of the connection port is a first potential state; and
    in an offline state, the connection port is disconnected from the connection pin, and the potential state is a second potential state.

8. The method for monitoring an offline state of an electronic device according to claim 6, wherein the step of the embedded controller calculating the interrupt period according to the number of signal transmissions and the second frequency comprises:
    the embedded controller packetizing information of the first frequency and the number of signal transmissions as offline information; and
    the embedded controller writing the offline information to a buffer memory.

9. The method for monitoring an offline state of an electronic device according to claim 8, wherein the step of the embedded controller writing the offline information to the buffer memory comprises:
    the embedded controller sending the offline information to a remote server.

10. The method for monitoring an offline state of an electronic device according to claim 9, wherein the remote server sends prompt information to the electronic device according to the offline information.

* * * * *